(12) United States Patent
Yun (10) Patent No.: US 9,196,888 B2
(45) Date of Patent: Nov. 24, 2015

(54) RECHARGEABLE BATTERY (75) Inventor: Hee-Sun Yun, Yongin-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 565 days.

(21) Appl. No.: 12/948,043

(22) Filed: Nov. 17, 2010

(65) Prior Publication Data

US 2011/0129720 A1 Jun. 2, 2011

(30) Foreign Application Priority Data

Dec. 1, 2009 (KR) ........................ 10-2009-0117925

(51) Int. Cl.
*H01M 2/26* (2006.01)
*H01M 2/02* (2006.01)
*H01M 10/02* (2006.01)
*H01M 10/04* (2006.01)
*H01M 2/10* (2006.01)
*H01M 2/20* (2006.01)

(52) U.S. Cl.
CPC .......... *H01M 2/263* (2013.01); *H01M 10/0431* (2013.01); *H01M 2/02* (2013.01); *H01M 2/022* (2013.01); *H01M 2/10* (2013.01); *H01M 2/202* (2013.01); *H01M 10/02* (2013.01); *H01M 10/0477* (2013.01)

(58) Field of Classification Search
None
See application file for complete search history.

(56) References Cited

U.S. PATENT DOCUMENTS

| 7,867,643 | B2 * | 1/2011 | Cho ................................ 429/61 |
| 2006/0019155 | A1 * | 1/2006 | Seman et al. ................. 429/159 |
| 2011/0177372 | A1 * | 7/2011 | Maguire et al. ................. 429/99 |
| 2011/0223776 | A1 * | 9/2011 | Ferber, Jr. ....................... 439/39 |

FOREIGN PATENT DOCUMENTS

| JP | 2004335452 | 11/2004 |
| JP | 2008-135374 | 6/2008 |
| JP | 2008-210729 | 9/2008 |
| KR | 1020090045388 A | 5/2009 |
| KR | 1020090046863 A | 5/2009 |
| KR | 1020090081966 A | 7/2009 |

* cited by examiner

Primary Examiner — Miriam Stagg
Assistant Examiner — Carmen Lyles-Irving
(74) Attorney, Agent, or Firm — Robert E. Bushnell, Esq.

(57) ABSTRACT

A rechargeable battery having a plurality of electrode assemblies, a first current collecting plate disposed at one side of the plurality of electrode assemblies, a second current collecting plate disposed at an opposite side of the plurality of the electrode assemblies, the first and second current collecting plates being electrically connected with the electrode assemblies. Each one of the first and second current collecting plates having a plurality of current collecting portions fixed to and electrically connected to the electrode assemblies, a connection portion electrically connecting at least two of the current collecting portions, and an insulating supporter supporting the current collecting portions and the connection portion by surrounding the current collecting portions and the connection portion. The insulating supporter includes a plurality of openings exposing the plurality of current collecting portions.

5 Claims, 11 Drawing Sheets

RECHARGEABLE BATTERY

CLAIM OF PRIORITY

This application makes reference to, incorporates the same herein, and claims all benefits accruing under 35 U.S.C. §119 from an application earlier filed in the Korean Intellectual Property Office on the 1st of Dec. 2009 and there duly assigned Serial No. 10-2009-0117925.

BACKGROUND OF THE INVENTION

1. Field of the Invention

The described technology relates generally to a rechargeable battery. More particularly, the described technology relates generally to a medium or large sized rechargeable battery formed by coupling a plurality of small electrode assemblies in parallel or in series.

2. Description of the Related Art

A rechargeable battery differs from a primary battery in that the rechargeable battery can be repeatedly charged and discharged, while the primary battery can only irreversibly convert chemical energy to electrical energy. A small sized rechargeable battery is used as a power supply for small electronic devices such as cellular phones, notebook computers, and camcorders, while a medium or large sized rechargeable battery is used as a power supply for driving motors in hybrid vehicles and the like.

The above information disclosed in this Background section is only for enhancement of understanding of the background of the described technology and therefore it may contain information that does not form the prior art that is already known in this country to a person of ordinary skill in the art.

SUMMARY OF THE INVENTION

One aspect of this disclosure provides an improved rechargeable battery.

Another aspect of this disclosure provides a medium or large sized rechargeable battery that is highly convenient in manufacturing by simplifying the entire structure and the assembling process while guaranteeing high safety.

A rechargeable battery according to an exemplary embodiment of the present invention may be constructed with a plurality of electrode assemblies disposed at a distance from each other, a first current collecting plate disposed at one side of the plurality of electrode assemblies, a second current collecting plate disposed at an opposite side of the plurality of the electrode assemblies, the first and second current collecting plates being electrically connected with the electrode assemblies, a case housing the electrode assemblies, the first current collecting plate, and the second current collecting plate, and an electrode terminal provided in the case, and electrically connected with at least one of the first and second current collecting plates. Each one of the first and second current collecting plates may be constructed with a plurality of current collecting portions fixed to and electrically connected to the electrode assemblies, each current collecting portion corresponding to a respective electrode assembly, a connection portion electrically connecting at least two of the current collecting portions, and an insulating supporter supporting the current collecting portions and the connection portion by surrounding the current collecting portions and the connection portion. The insulating supporter may include a plurality of openings exposing the plurality of current collecting portions, and each opening corresponds to a respective current collecting portion.

Each of the electrode assemblies may be formed by being wound in a jelly roll shape, and may include a positive electrode uncoated region disposed at one side of the electrode assembly and a negative electrode uncoated region disposed at an opposite side of the electrode assembly.

The electrode assemblies may be arranged in a way that the positive electrode uncoated regions of the electrode assemblies are disposed at a first side of the electrode assemblies, and the negative electrode uncoated regions of the electrode assemblies are disposed at a second and opposite side of the electrode assemblies.

The electrode assemblies may be arranged in a matrix form having a plurality of columns and a plurality of rows. In each of the first and second current collecting plates, the connection portion may be disposed between neighboring current collecting portions along a column direction and a row direction of the matrix to electrically connect all of the current collecting portions.

The first current collecting plate may include a first extension tab extending from one of the current collecting portions of the first current collecting plate to an external side of the insulating supporter of the first current collecting plate. The second current collecting plate may include a second extension tab extending from one of the current collecting portions of the second current collecting plate to an external side of the insulating supporter of the second current collecting plate.

The electrode terminal may include a positive electrode terminal and a negative electrode terminal. One of the first and second extension tabs may be fixed to the positive electrode terminal, and the other one of the first and second extension tabs may be fixed to the negative electrode terminal.

Alternatively, a positive electrode uncoated region of each one of the electrode assemblies and negative electrode uncoated regions of neighboring electrode assemblies along both the column and the row direction may be disposed at the same side of the electrode assemblies, and a negative electrode uncoated region of each one of the electrode assemblies and positive electrode uncoated regions of neighboring electrode assemblies along both the column and the row direction may be disposed at the same side of the electrode assemblies.

In each one of the first and second current collecting plates, the connection portion may be disposed between two current collecting portions along either one of the column direction and the row direction, such that the two neighboring current collecting portions and the one connection portion form an individual set.

The connection portions of the first and second current collecting plates may be disposed in different locations along an axis direction of the electrode assembly. The connection portions and the current collecting portions of the first and second current collecting plates and the plurality of electrode assemblies may form an electrically conductive path in one direction from a first outmost electrode assembly to a second outmost electrode assembly.

One of the first and second current collecting plates may include a first extension tab and a second extension tab. The first extension tab may be extended from a current collecting portion corresponding to the first outmost electrode assembly to an external side of the insulating in supporter. The second extension tab may be extended from another current collecting portion corresponding to the second outmost electrode assembly to another external side of the insulating supporter.

In each one of the first and second current collecting plates, the insulating supporter may include a first insulation film disposed at one side of the plurality of the current collecting portions and the connection portion, and a second insulation film disposed at an opposite side of the plurality of the current collecting portions and the connection portion and air-tightly attached to the first insulation film. An opening may be formed in each of the first and second insulation films.

The current collecting portions may be formed in a shape corresponding to a shape of the positive and negative electrode uncoated regions. The connection portion may have a width that is smaller than a maximum width of the current collecting portion.

Alternatively, the current collection portions and the connection portion may be formed in a band shape connected in one direction while having the same width.

The rechargeable battery may further include at least one spacer disposed between the neighboring electrode assemblies and air-tightly attached to the neighboring electrode assemblies.

Each one of the current collecting portion may include at least one protruding portion at one side of the current collecting portion facing the electrode assembly, so as to increase a contact area with the electrode assembly.

According to the exemplary embodiment of the present invention, a plurality of electrode assemblies can be arranged in various shapes in one case so that a medium or large sized rechargeable battery can be easily manufactured without manufacturing the electrode assembly to be large-sized or packaging individually manufactured rechargeable batteries as a module. Accordingly, the capacity or the output voltage of the medium or large sized rechargeable battery can be increased while improving safety in the electrode assemblies.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE INVENTION

A rechargeable battery basically includes an electrode assembly with a positive electrode plate, a separator, and a negative electrode plate, a case housing the electrode assembly, and an electrode terminal electrically connected to the electrode assembly and drawn out of the case. The electrode assembly may be formed by winding in a jelly roll form. Alternatively, the electrode assembly may be formed by stacking the positive electrode plate, the separator, and the negative electrode plate, and folding the stack of the positive electrode plate, the separator, and the negative electrode plate in a zigzag method. Still alternatively, the electrode assembly may be formed in a stacked form of anodes, cathodes, and separators that are individually stacked.

In general, for manufacturing a medium-sized or large-sized rechargeable battery, the electrode assembly is increased in size, or a plurality of small-sized rechargeable batteries are modularized by coupling the small rechargeable batteries in series or in parallel.

The large-sized electrode assembly may, however, cause a problem in safety. In addition, the coupling of a plurality of small rechargeable batteries requires a complicated structure and assembling process, because the plurality of smaller rechargeable batteries are individually manufactured and then packaged as a module by connecting electrode terminals of the rechargeable batteries. In this case, manufacturing cost can be undesirably increased and manufacturing undesirably consumes much time.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

Figure 1:
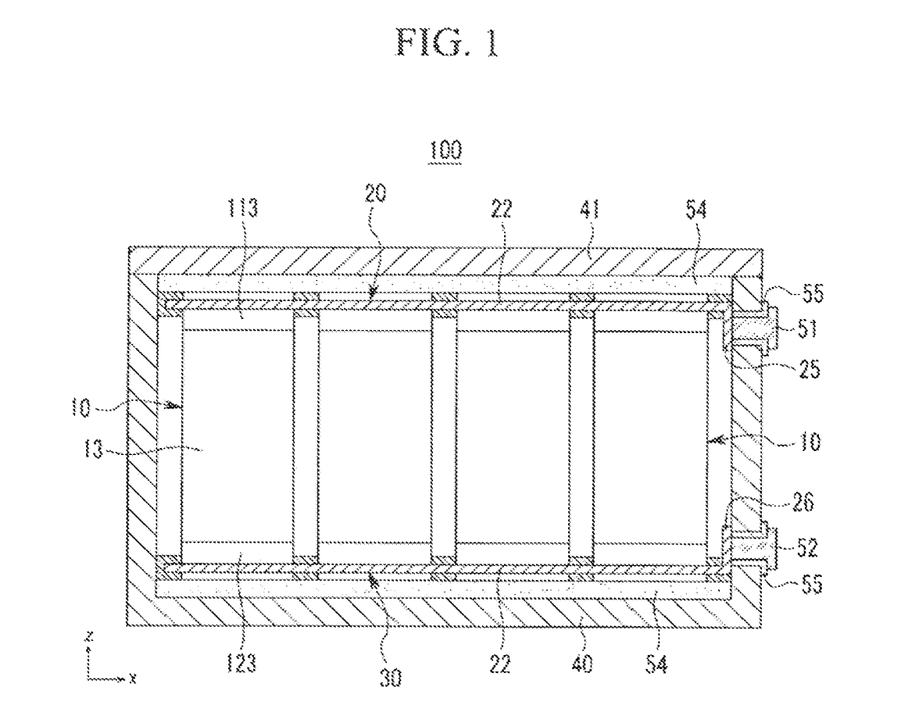
FIG. 1 is a cross-sectional view of a rechargeable battery constructed as a first exemplary embodiment according to the principles of the present invention.

FIG. 1 is a cross-sectional view of a rechargeable battery constructed as a first exemplary embodiment according to the principles of the present invention.

Referring to FIG. 1, a rechargeable battery 100 of the first exemplary embodiment is constructed with a plurality of electrode assemblies 10, first and second current collecting plates 20 and 30 electrically connected to electrode assemblies 10, a case 40 housing first and second current collecting plates 20 and 30, a cap plate 41 coupled to an open end of case 40 to close and seal case 40, and positive and negative electrode terminals 51 and 52 electrically connected to electrode assemblies 10.

Rechargeable battery 100 constructed as the first exemplary embodiment has a structure in which the capacity of rechargeable battery 100 is increased by the number of electrode assemblies 10 by connecting electrode assemblies 10 in parallel. For this, first current collecting plate 20 disposed at one side of electrode assemblies 10 functions as a positive electrode current collecting plate, and second current collecting plate 30 disposed at the other side of electrode assemblies 10 functions as a negative electrode current collecting plate.

Figure 2:
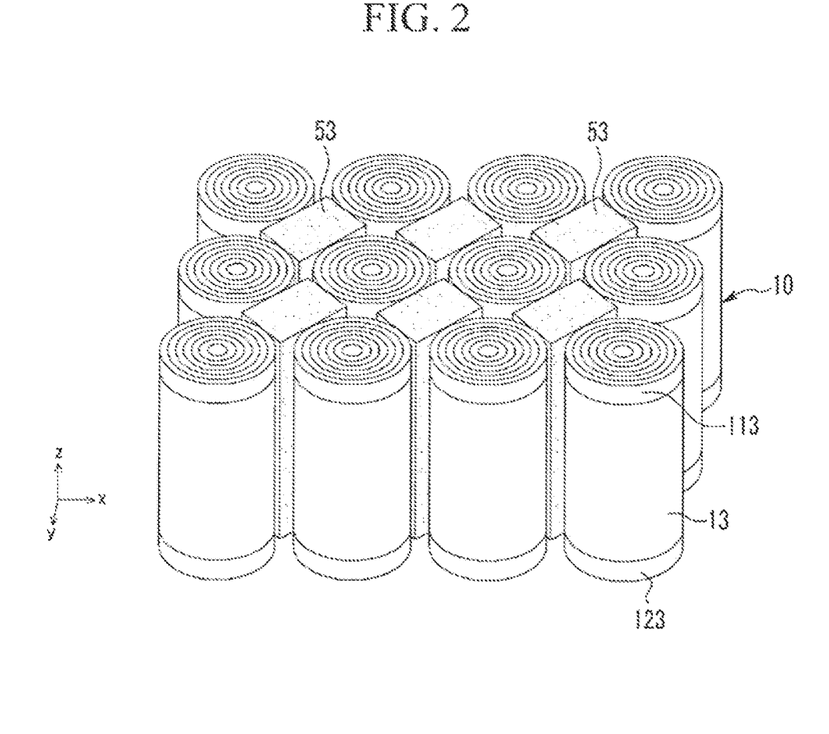
FIG. 2 is an oblique view of electrode assemblies of the rechargeable battery of FIG. 1.

FIG. 2 is an oblique view of the electrode assemblies of the rechargeable battery of FIG. 1.

Referring to FIG. 2, electrode assemblies 10 are provided in plural along a column direction (x-axis direction of the drawing) and a row direction (y-axis direction in the drawing), and are disposed at a distance from each other. That is, electrode assemblies 10 are arranged in a matrix form having a plurality of columns and a plurality of rows. When electrode assembly 10 is driven, heat is emitted, but heat generated from one electrode assembly 10 can be prevented a from being transmitted to a neighboring electrode assembly 10 by the space between electrode assemblies 10, so that safety of the rechargeable battery can be increased.

A spacer 53 may be disposed in each space between electrode assemblies 10. Spacer 53 prevents electrode assemblies 10 from falling, and reduces wasteful use of electrolyte solution. Spacer 53 may be disposed at the center of four neighboring electrode assemblies 10, and may have various shapes that can fill the space between the neighboring electrode assemblies 10. Spacer 53 is made of an insulating material having high heat resistance and chemical resistance with respect to an organic material. A metallic material attached with an insulation coating film or an insulation sheet, or various polymer materials, can be used as spacer 53.

Figure 3:
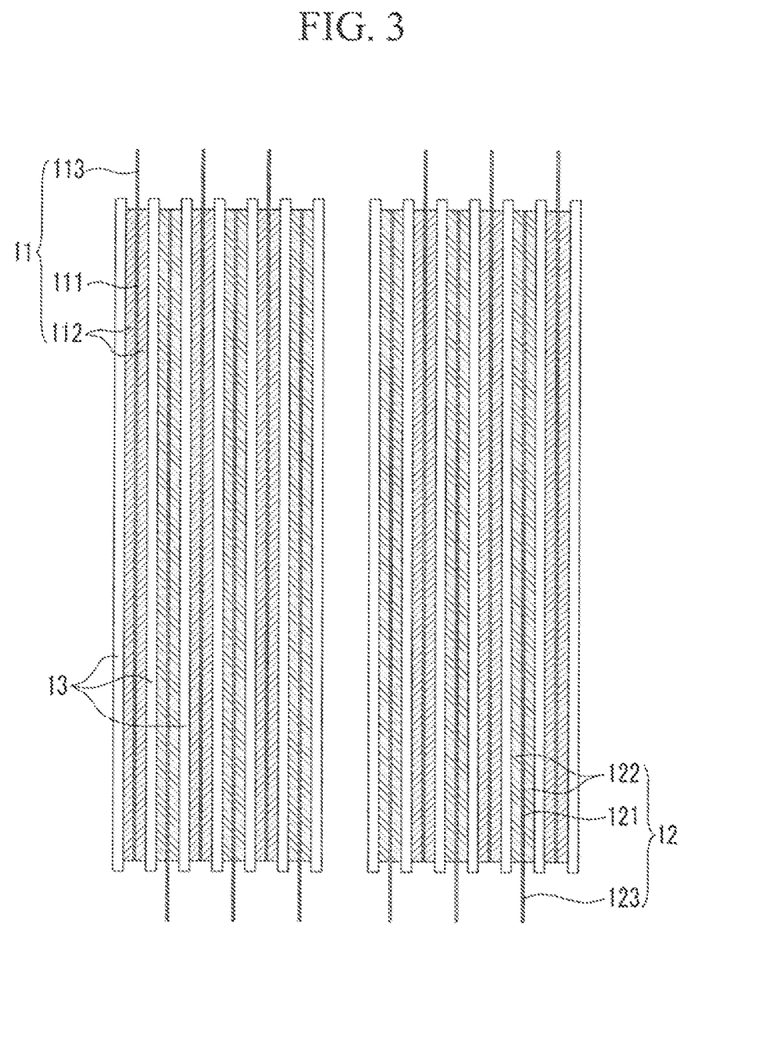
FIG. 3 is a cross-sectional view of one of the electrode assemblies of FIG. 2.

FIG. 3 is a cross-sectional view of one of the electrode assemblies of FIG. 2.

Referring to FIG. 3, electrode assembly 10 has a structure formed by winding a positive electrode 11 and a negative electrode 12 in a jelly roll shape, interposing a separator 13 therebetween.

Positive electrode 11 includes a positive electrode current collector 111 made of a thin metal foil, and a positive electrode active material layer 112 formed in positive electrode current collector 111. Positive electrode active material layer 112 has a width that is smaller than that of positive electrode current collector 111 to partially expose positive electrode current collector 111. A region that is not coated with a positive electrode active material in positive electrode current collector 111 is a positive electrode uncoated region 113, and positive electrode uncoated region 113 is disposed at one side of electrode assembly 10.

Negative electrode 12 includes a negative electrode current collector 121 made of a thin metal foil, and a negative electrode active material layer 122 formed in negative electrode current collector 121. Negative electrode active material layer 122 has a width that is smaller than that of negative electrode current collector 121 to partially expose negative electrode current collector 121. A region that is not coated with a negative electrode active material in negative electrode current collector 121 is a negative electrode uncoated region 123, and negative electrode uncoated region 123 is disposed at the other side of electrode assembly 10.

Figure 5:
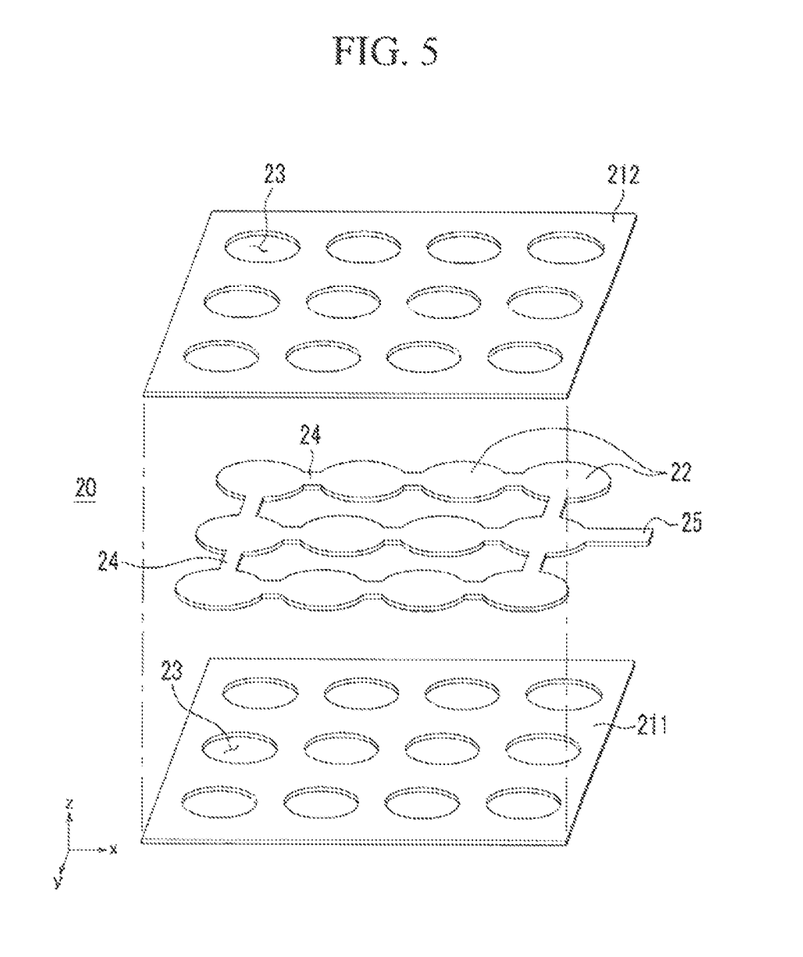
FIG. 5 is an exploded oblique view of the first current collecting plate of FIG. 4 constructed as an embodiment according to the principles of the present invention.

Referring to FIGS. 1, 2 and 5, in rechargeable battery 100 constructed as one embodiment according to the principles of the present invention, in all of electrode assemblies 10, positive electrode uncoated regions 113 are disposed at the same side and negative electrode uncoated regions 123 are disposed at the same side. That is, when a positive electrode uncoated region 113 in one electrode assembly 10 is disposed at an upper portion of the one electrode assembly 10, positive electrode uncoated regions 113 of the rest of electrode assemblies 10 are disposed at the upper portions of the rest of the electrode assemblies 10; meanwhile, negative electrode uncoated regions 123 of all of electrode assemblies 10 are disposed at lower portions of electrode assemblies 10.

In FIG. 1 and FIG. 2, positive electrode uncoated regions 113 and negative electrode uncoated regions 123 are respectively disposed at the upper portions and the lower portions of the respective electrode assemblies 10.

First current collecting plate 20 is disposed at an upper side of electrode assemblies 10 and coupled with each of positive electrode uncoated regions 113 to function as a positive electrode current collecting plate. Second current collecting plate 30 is disposed at a lower side of electrode assemblies 10 and is coupled with each of negative electrode uncoated regions 123 to function as a negative electrode current collecting plate. When positive electrode uncoated region 113 and negative electrode uncoated regions 123 are respectively disposed at the upper portions and the lower portions of the respective electrode assemblies 10, the function of first current collecting plate 20 and the function of second current collecting plate 30 become opposite to each other.

In rechargeable battery 100 of the first exemplary embodiment, first current collecting plate 20 and second current collecting plate 30 are not made of a single metal plate. Each one of first current collecting plate 20 and second current collecting plate 30 is constructed with a plurality of current collecting portions 22 supported by an insulating supporter 21. Each one of the plurality of current collecting portions 22 is disposed to correspond to a respective electrode assembly 10. In this case, current collecting portions 22 are exposed to an exterior of the current collecting plate by openings 23 formed in insulating supporter 21. Current collecting portions 22 are fixed to uncoated regions 113 and 123 of the corresponding electrode assemblies 10 by welding or similar methods.

Figure 4:
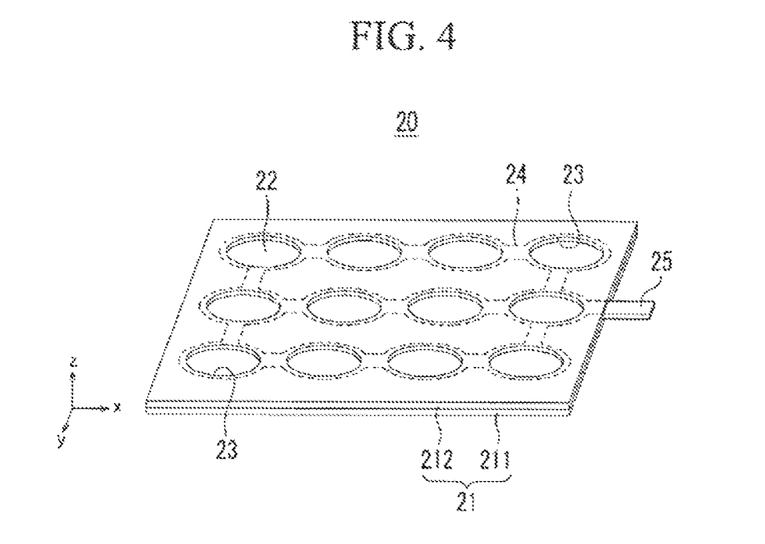
FIG. 4 is an oblique view of a first current collecting plate of the rechargeable battery of FIG. 1.

FIG. 4 is an oblique view of the first current collecting plate of the rechargeable battery of FIG. 1, and FIG. 5 is an exploded oblique view of the first current collecting plate of FIG. 4. Since the second current collecting plate has the same structure as the first current collecting plate, the second current collecting plate is not shown.

Referring to FIG. 4 and FIG. 5, first current collecting plate 20 includes a plurality of current collecting portions 22 each corresponding to a respective electrode assembly 10, a connection portion 24 electrically connecting current collecting portions 22, and an insulating supporter 21 supporting current collecting portions 22 and connection portion 24 by surrounding current collecting portions 22 and connection portion 24. Current collecting portions 22 and connection portion 24 are made of metal. Insulating supporter 21 includes a plurality of openings 23. Each opening 23 corresponds to a respective current collecting portion 22 to expose current collecting portion 22 to an exterior of first current collecting plate 20.

Current collecting portions 22 are disposed to each correspond to a respective electrode assembly 10. Current collecting portions 22 are formed in a round shape corresponding to the shape of electrode assemblies 10, and disposed at a distance from each other corresponding to the arrangement of electrode assemblies 10. In the rechargeable battery 100 of the first exemplary embodiment, all of current collecting portions 22 are electrically connected to each other because first current collecting plate 20 functions as the positive electrode current collecting plate.

Thus, connection portion 24 is disposed between neighboring current collecting portions 22 along the column direction (x-axis direction in the drawing) and between neighboring current collecting portions 22 along the row direction (y-axis direction in the drawing) to electrically connect current collecting portions 22. Connection portion 24 may not, however, have to be disposed between all of the neighboring current collecting portions 22 along the column direction and between all of the neighboring current collecting portions 22 along the row direction, and may have any structure that can electrically connect all of current collecting portions 22.

Insulating supporter 21 is formed of a first insulation film 211 disposed at a lower side of current collecting portions 22 and connection portion 24, and a second insulation film 212 disposed at an upper side of current collecting portions 22 and connector 24 and air-tightly attached to first insulation film 211. First insulation film 211 and second insulation film 212 are constructed with openings 23 respectively corresponding to current collecting portions 22 to expose the upper side and the lower side of each of current collecting portions 22. Openings 23 of first and second insulation films 211 and 212 are smaller than the respective current collecting portions 22 such that first and second insulation films 211 and 212 can stably support current collecting portions 22.

First and second insulation films 211 and 212 may be made of an insulating polymer, that is, polypropylene, polyethylene, polyethylene terephthalate, polyimide, or nylon. Insulating supporter 21 exposes only a conductive portion (current collecting portion) that is substantially coupled with first current collecting plate 20 and insulates the other portion, that is, a portion that does not face electrode assembly 10.

Figure 6:
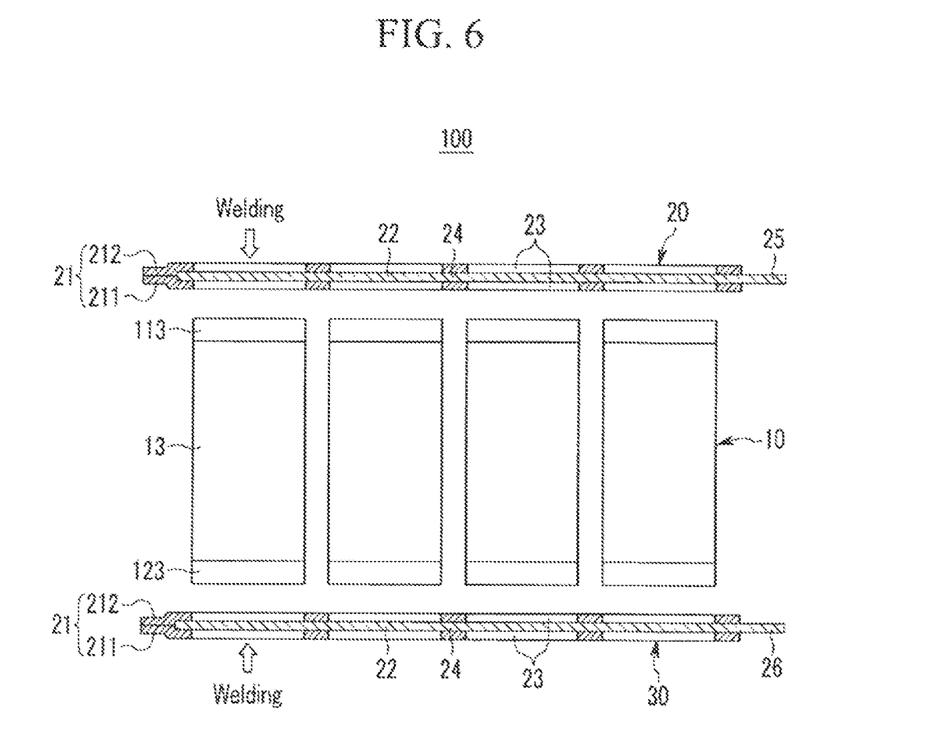
FIG. 6 is an exploded oblique view of a before-coupling state of the first current collecting plate and a second current collecting plate of the rechargeable battery of FIG. 1.

FIG. 6 is an exploded view of the first current collecting plate, the second current collecting plate, and the electrode assemblies of FIG. 1 in a before-coupling state, that is, before the first current collecting plate, the second current collecting plate, and the electrode assemblies are coupled together.

Referring to FIG. 6, first current collecting plate 20 and second current collecting plate 30 are prepared. Electrode assemblies 10 are disposed on second current collecting plate 30. Then, current collection portions 22 of second current collecting plate 30 and negative electrode uncoated regions 123 of electrode assemblies 10 are fixed at an external side (a lower side as shown in FIG. 6) of second current collecting plate 30 by welding or similar methods. After that, first current collecting plate 20 is disposed on electrode assemblies 10 and current collecting portions 22 of first current collecting plate 20. Positive electrode uncoated regions 113 of electrode assemblies 10 are fixed at an external side (an upper side as shown in FIG. 6) of first current collecting plate 20 by welding or similar methods.

In this case, the diameter of opening 23 of first current collecting plate 20 is slightly larger than the diameter of positive electrode uncoated region 113 in order to insert positive electrode uncoated region 113 into opening 23 of first current collecting plate 20; and the diameter of opening 23 of second current collecting plate 30 is slightly larger than the diameter of negative electrode uncoated region 123 in order to insert negative electrode uncoated region 123 into opening 23 of second current collecting plate 30. Therefore, electrode assemblies 10 can be arranged in a precise location without a separate alignment process when coupling first and second current collection plates 20 and 30 and electrode assemblies 10.

A first extension tab 25 is provided in first current collecting plate 20 to extend from one current collecting portion 22 to an exterior of to insulating supporter 21. A second extension tab 26 is provided in second current collecting plate 30 to extend from one current collecting portion 22 to an exterior of insulating supporter 21. Referring to FIG. 1, first extension tab 25 is fixed to positive electrode terminal 51 for electrical connection therewith, and second extension tab 26 is fixed to negative electrode terminal 52 for electrical connection therewith.

Figure 7:
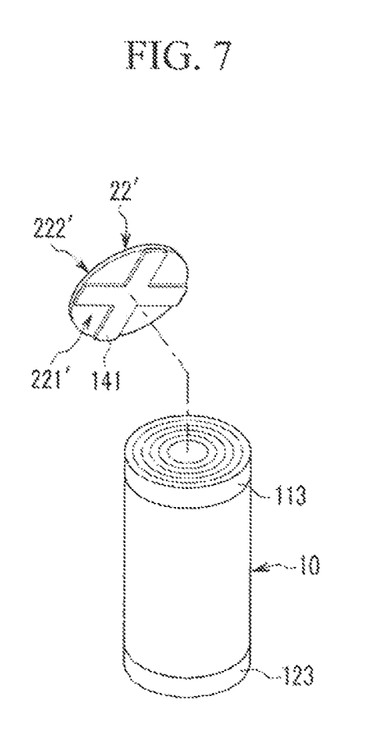
FIG. 7 is an exploded oblique view of a current collecting portion and an electrode assembly constructed as another embodiment according to the principles of the present invention.
Figure 8:
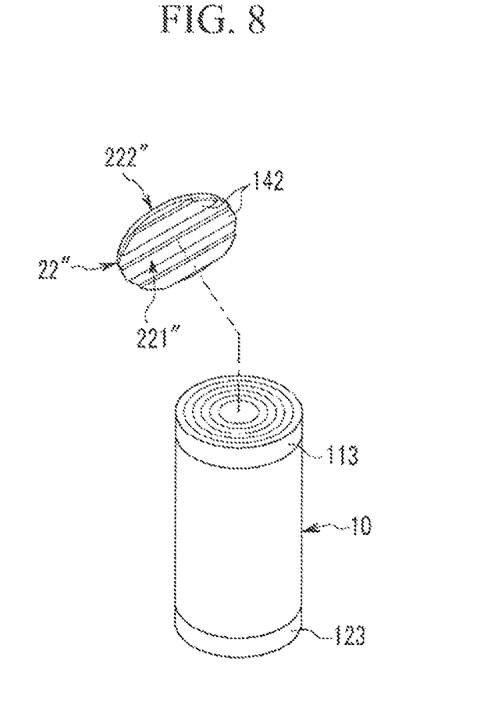
FIG. 8 is an exploded oblique view of a current collecting portion and an electrode assembly constructed as still another embodiment according to the principles of the present invention.

FIG. 7 shows an exemplary variation of the current collecting portion constructed as an embodiment according to the principles of the present invention. FIG. 8 shows another exemplary variation of the current collecting portion constructed as another embodiment according to the principles of the present invention.

According to FIGS. 7 and 8, a protruding portion may be formed at one side of current collecting portion 22 facing electrode assembly 10, and a recess portion may be formed at one side of electrode assembly 10 facing current collecting portion 22. In this way, current collecting portion 22 and electrode assembly 10 may be mechanically coupled to simultaneously define a welding portion between current collecting portion 22 and electrode assembly 10.

Referring to FIG. 7, a radial-shaped protruding portion 141 for increasing a contact area between current collecting portion 22' and electrode assembly 10 is formed in one side 221' of current collecting portions 22' facing electrode assembly 10. Accordingly, when resistance welding is performed at the opposite side 222' of current collecting portions 22' in which protruding portion 141 is not formed, current collecting portion 22' and electrode assembly 10 are air-tightly attached to each other. In addition, when the radial-shaped protruding portion 141 is pressed toward electrode assembly, current collecting portion 22' and electrode assembly 10 are further tightly coupled to each other.

Referring to FIG. 8, a plurality of bar-shaped protruding portions 142 for increasing a contact area with electrode assembly 10 are formed in one side 221" of current collecting portion 22" facing electrode assembly 10. Accordingly, when resistance welding is performed at the opposite side 222" of current collecting portion 22" in which protruding portions 142 are not formed, current collecting portion 22" and electrode assembly 10 are air-tightly attached to each other. In addition, when the plurality of bar-shaped protruding portions 142 are pressed toward electrode assembly 10, current collecting portion 22" and electrode assembly 10 are further tightly coupled to each other.

With protruding portions 141 and 142, the welding efficiency of first and second current collecting plates 20 and 30 and electrode assemblies 10 can be increased and assembling therebetween can be easily performed, and the plurality of electrode assemblies 10 can be simultaneously welded to one current collecting plate. The shapes of protruding portions 141 and 142 in FIG. 7 and FIG. 8 are not restrictive, and may be variously modified.

Figure 9:
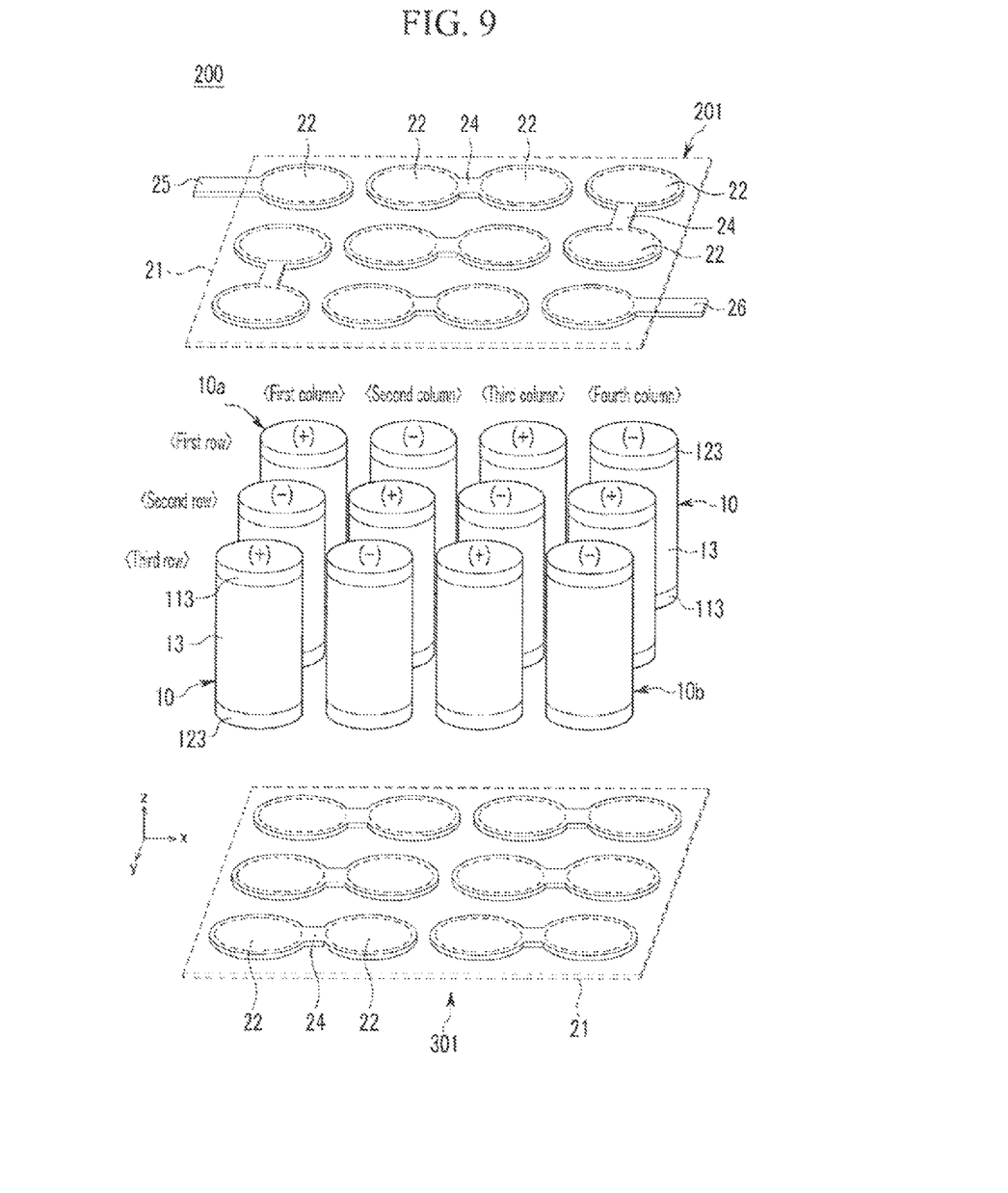
FIG. 9 is an exploded oblique view of a first current collecting plate, a second current collecting plate, and electrode assemblies constructed as a second exemplary embodiment according to the principles of the present invention.

FIG. 9 shows an exploded oblique view of a first current collecting plate, a second current collecting plate, and electrode assemblies of a rechargeable battery constructed as a second exemplary embodiment according to the principles of the present invention.

Referring to FIG. 9, a rechargeable battery 200 constructed as the second exemplary embodiment has a structure in which electrode assemblies 10 are coupled in series for increasing an output voltage. For this, in arrangement of electrode assemblies 10, positive electrode uncoated regions 113 and negative electrode uncoated regions 123 are alternately disposed in upper and lower portions of the respective electrode assemblies 10. That is, if a positive electrode uncoated region 113 is disposed in the upper portion of one electrode assembly 10, negative electrode uncoated regions 123 of the neighboring electrode assemblies 10 along the column and row directions of the one electrode assembly 10 are disposed in the upper portions of the neighboring electrode assemblies 10.

In addition, a connection portion 24 of a first current collecting plate 201 is disposed between two neighboring current collecting portions 22 neighboring along the column or row direction to electrically connect the two neighboring current collecting portions 22. Thus, two current collecting portions 22 and one connection portion 24 form an independent set separated from other current collecting portions 22. Similarly, a connection portion 24 of a second current collecting plate 301 is disposed between two neighboring current collecting portions 22 neighboring along the column or row direction to electrically connect the two neighboring current collecting portions 22. Thus, two current collecting portions 22 and one connection portion 24 form an independent set separated from other current collecting portions 22.

Connection portion 24 of first current collecting plate 201 and connection portion 24 of second current collecting plate 301 are not, however, disposed in the same location along the axis-direction (z-axis direction) of electrode assembly 10. Connection portion 24 of first current collecting plate 201 and connection portion 24 of second current collecting plate 301 are arranged to form a conductive path using first and second current collecting plates 201 and 301 along one direction from one outmost electrode assembly 10a to another outmost electrode assembly 10b.

In FIG. 9, first current collecting plate 201 and second current collecting plate 301 are arranged to form a conductive path extending along one direction from electrode assembly 10a in the first column and the first row through current collecting portions 22 of second current collecting plate 301 and current collecting portions 22 of first current collecting plate 201 to electrode assembly 10b in the third column and the fourth row. According to the number and arrangement of the electrode assemblies 10, the internal structure of first and second current in collecting plates 201 and 301 may be variously modified.

In rechargeable battery 200 of the second exemplary embodiment, a first extension tab 25 is extended to an external side of an insulating supporter 21 from a current collection portion 22 corresponding to one outmost electrode assembly 10a so as to be fixed to a positive electrode terminal 51. Similarly, a second extension tab 26 is extended to another external side of insulating supporter 21 from a current collecting portion 22 that corresponds to another outmost electrode assembly 10b so as to be fixed to a negative electrode terminal 52.

FIG. 9 illustrates that first extension tab 25 and second extension tab 26 are formed in first current collecting plate 201. In this case, positive electrode terminal 51 and negative electrode terminal 52 are respectively disposed facing first extension tab 25 and second extension tab 26. Rechargeable battery 200 of the second exemplary embodiment has a structure similar to that of rechargeable battery 100 of the first exemplary embodiment, except locations of positive and negative electrode uncoated regions 113 and 123 and locations of the connection portions of first and second current collecting plates 201 and 301.

Referring back to FIG. 1, rechargeable battery 100 is further constructed with at least one insulation member 54 and at least one insulation gasket 55. An insulation member 54 may be disposed at an upper side of first current collecting plate 20 to electrically and thermally insulate first current collecting plate 20 from cap plate 41. Another insulation member 54 may be disposed at a lower side of second current collecting plate 30 to electrically and thermally insulate second current collecting plate 30 from case 40. An insulation gasket 55 is disposed around positive electrode terminal 51 to electrically and thermally insulate positive electrode terminal 51 from case 40. Another insulation gasket 55 is disposed around negative electrode terminal to electrically and thermally insulate negative electrode terminal 52 from case 40. Insulation member 54 and insulation gasket 55 illustrated in FIG. 1 are shown as an exemplary embodiment according to the principles of the present invention. The shape and location of the insulation member and the insulation gasket may be variable as long as the insulation member can electrically and thermally insulate the current collecting plates from the case or the cap plate, and the insulation gasket can electrically and thermally insulate the electrode terminals from the case.

As described, in rechargeable batteries 100 and 200 of the first and second exemplary embodiments, first and second current collecting plates 20 and 30 are not made of a single metal plate. Each one of first and second current collecting plates 20 and 30 is formed by stacking current collecting portions 22 that enable various arrangements by connection portions 24 and insulating supporter 21 that supports current collecting portions 22 by surrounding current collecting portions 22. Thus, the plurality of electrode assemblies 10 can be coupled in series or in parallel in one case 40 so that the structure and the assembling method of the respective rechargeable batteries 100 and 200 can be simplified.

That is, since the plurality of electrode assemblies 10 can be arranged in various shape in one case 40, electrode assembly 10 can be manufactured in a large size, and thus a medium-sized or large-sized rechargeable battery can be easily manufactured without packaging individually manufactured rechargeable batteries as a module. Accordingly, the capacity and the output voltage of the rechargeable battery can be increased while increasing safety of electrode assemblies 10.

Figure 10:
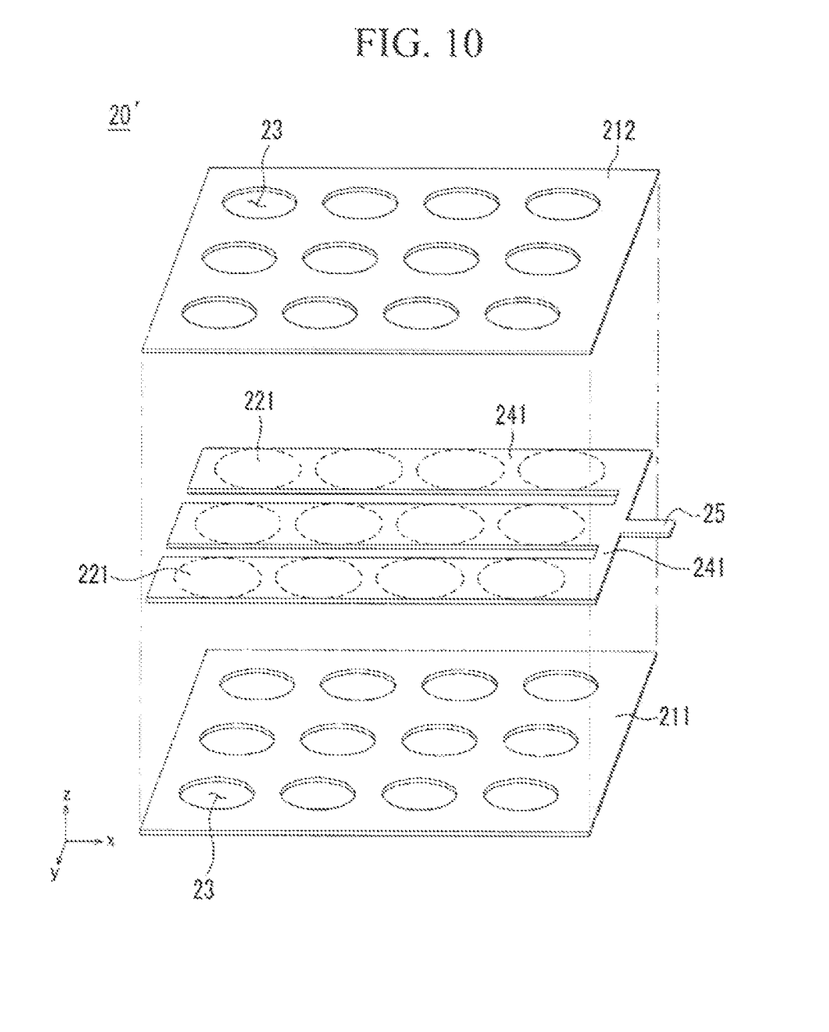
FIG. 10 is an exploded oblique view of a first current collecting plate of constructed as another embodiment according to the principles of the present invention.

FIG. 10 is an exploded oblique view of a first current collecting plate 20' constructed as another embodiment according to the principles of the present invention. Since the second current collecting plate may have the same structure as the first current collecting plate, the second current collecting plate is not shown.

Although current collecting portions 22 in the embodiment shown in FIG. 5 are formed in a round shape corresponding to the shape of electrode assemblies 10 and the width of connection portion 24 is smaller than the diameter (the maximum width) of current collecting portion 22, in first current collecting plate 20' of the embodiment shown in FIG. 10, a current collecting portion 221 and a connection portion 241 may be formed in a band shape having the same width and extended in one direction. In this case, current collecting portion 221 and connection portion 241 can be easily processed and electrical resistance between current collecting portions 221 can be minimized because they do not need to be individually formed.

Figure 11:
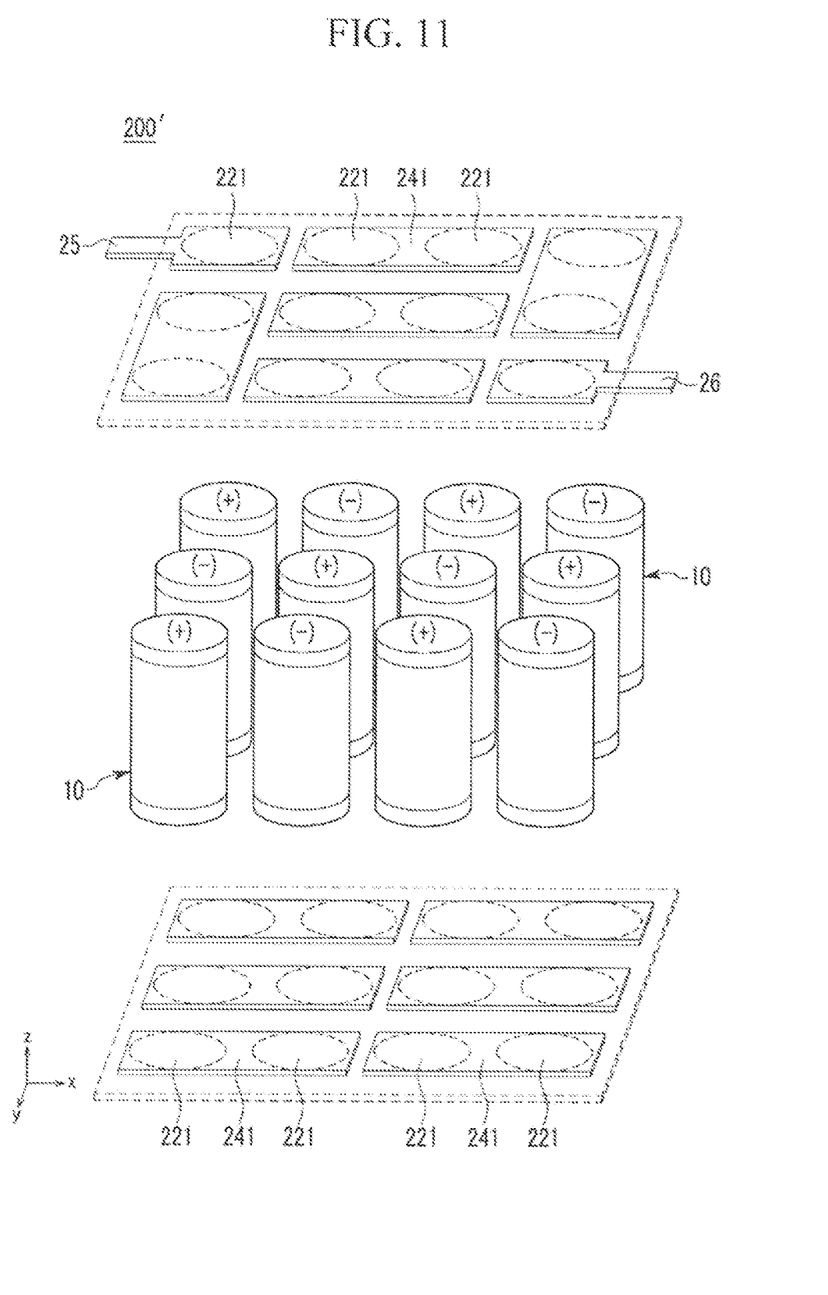
FIG. 11 is an exploded oblique view of a first current collecting plate, a second current collecting plate, and electrode assemblies constructed as still another exemplary embodiment according to the principles of the present invention.

FIG. 11 shows an exploded oblique view of a first current collecting plate, a second current collecting plate, and electrode assemblies of a rechargeable battery constructed as still another exemplary embodiment according to the principles of the present invention.

Rechargeable battery 200' of FIG. 11 has a structure similar to that of rechargeable as battery 200 of FIG. 9, expect the shape of current collecting portion 221 and connection portion 241. That is, current collecting portion 221 and connection portion 241 may be formed in a band shape having the same width.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A rechargeable battery, comprising:
   a plurality of electrode assemblies disposed at a distance from each other;

a first current collecting plate disposed at one side of the plurality of the electrode assemblies;

a second current collecting plate disposed at an opposite side of the plurality of the electrode assemblies, the first and second current collecting plates being electrically connected with the electrode assemblies;

a case housing the electrode assemblies, the first current collecting plate, and the second current collecting plate; and an electrode terminal provided in the case, and electrically connected with at least one of the first and second current collecting plates, each one of the first and second current collecting plates comprises:

a plurality of current collecting portions fixed to and electrically connected to the electrode assemblies, each current collecting portion corresponding to a respective electrode assembly;

a connection portion electrically connecting at least two of the current collecting portions; and a single insulating supporter supporting each of the current collecting portions and the connection portion by surrounding the current collecting portions and the connection portion, the insulating supporter comprising a plurality of openings exposing the plurality of current collecting portions, and each opening corresponding to a respective current collecting portion, wherein each of the electrode assemblies is formed by being wound in a jelly roll shape, and comprises a positive electrode uncoated region disposed at one side of the electrode assembly and a negative electrode uncoated region disposed at an opposite side of the electrode assembly with both the positive and negative electrode uncoated regions formed in a longitudinal direction of the jelly roll shape, said current collecting portion and said connection portion are both disposed in a single geometric plane, said single geometric plane is a two-dimensional flat surface, wherein the electrode assemblies are arranged in a matrix form having a plurality of columns and a plurality of rows, a positive electrode uncoated region of each one of the electrode assemblies and negative electrode uncoated regions of neighboring electrode assemblies along both a column and a row direction of the matrix are disposed at the same side of the electrode assemblies, and the electrode assemblies are electrically connected in series by the first and second current collecting plates.

2. The rechargeable battery of claim 1, wherein, in each one of the first and second current collecting plates, the connection portion is disposed between two neighboring current collecting portions along either one of the column direction and the row direction, such that the two neighboring current collecting portions and said connection portion form an individual set.

3. The rechargeable battery of claim 2, wherein the connection portions of the first and second current collecting plates are disposed in different locations along an axis direction, and the connection portions and the current collecting portions of the first and second current collecting plates and the plurality of electrode assemblies form an electrically conductive path in one direction from a first outmost electrode assembly to a second outmost electrode assembly.

4. The rechargeable battery of claim 3, wherein one of the first and second current collecting plates comprises a first extension tab and a second extension tab, the first extension tab is extended from a current collecting portion corresponding to the first outmost electrode assembly to an external side of the insulating supporter, and the second extension tab is extended from another current collecting portion corresponding to the second outmost electrode assembly to another external side of the insulating supporter.

5. The rechargeable battery of claim 4, wherein the electrode terminal comprises a positive electrode terminal and a negative electrode terminal, and one of the first and second extension tabs is fixed to the positive electrode terminal and the other one of the first and second extension tabs is fixed to the negative electrode terminal.

* * * * *